3,642,756
METHOD FOR INCREASING THE CAPACITY OF A POLYMERIZATION VESSEL DURING POLYMERIZATION OF VINYL CHLORIDE MONOMER IN AQUEOUS SUSPENSION
Merritt R. Meeks, Midland, and Joseph L. Garner, Sanford, Mich., assignors to The Dow Chemical Company, Midland, Mich.
No Drawing. Filed Aug. 22, 1969, Ser. No. 852,486
Int. Cl. C08f 1/82, 3/30, 1/11
U.S. Cl. 260—92.8 W                 3 Claims

ABSTRACT OF THE DISCLOSURE

The present invention is directed to a method of effectively eliminating the rapid polymerization or "hot-spot" normally encountered near the end of the suspension polymerization reaction of vinyl chloride monomer. This result is obtained by the addition to the aqueous suspension of vinyl chloride monomer to be polymerized of small but effective amounts of one or more compounds capable of effectively inhibiting the polymerization reaction under normal polymerization temperatures and pressures. The addition of such polymerization inhibitors effectively eliminate such polymerization "hot-spot" and additionally, unexpectedly permits the utilization of increased amounts of polymerization initiators with resultant increased overall rates of polymerization, without exceeding the cooling capacity of a given reaction vessel.

---

Polymerization of vinyl chloride monomer in aqueous suspension is well known. In such polymerization, the monomer is dispersed by means of vigorous agitation in a medium which is not a solvent either for the monomer or the polymer, generally water, in the presence of a protective colloid to prevent the coagulation of the droplets, and of a polymerization initiator which is usually oil soluble. Such polymerizations are characterized by a rapid polymerization rate increase near the termination of the polymerization or a polymerization "hot-spot," thus requiring utilization of a polymerization vessel having adequate cooling capacity to effectively remove the heat generated during such "hot-spot," but wherein a large portion of the cooling capacity of such vessel remains unused during much of the polymerization reaction.

It is the primary object of the present invention to provide a method for effectively eliminating such "hot-spot" during the polymerization of vinyl chloride monomer in aqueous suspension, thus effectively increasing the capacity of a given polymerization vessel during such polymerization reaction.

This object has unexpectedly been realized by the addition to the aqueous suspension of vinyl chloride monomer to be polymerized of small but effective amounts of one or more compounds capable of effectively inhibiting the polymerization reaction under conventional conditions of temperature and pressure. The addition of such compounds, as specifically described infra, has been found to effectively eliminate the polymerization "hot-spot" and, in addition, permits the utilization of increased amounts of polymerization initiators with a resultant overall increase in polymerization rates, thus resulting in the utilization of the maximum cooling capacity of the reaction vessel during the entire polymerization reaction.

The compounds found to be effective for the purpose of the present invention include those materials which are capable of significantly inhibiting the polymerization of vinyl chloride monomer at a polymerization temperature of between about 45° C. to 65° C., while present in the monomer in concentrations capable of effectively reducing the polymerization rate at the polymerization peak to about the average over-all rate obtained without a polymerization inhibitor. Generally, concentrations ranging from about 25 to 200 p.p.m., based on monomer weight, are used.

Exemplary of particularly preferred compounds or polymerization inhibitors are hydroquinone, p-methoxy phenol, phenol and the alkoxy phenols, when present in amounts of from about 25 to 35 p.p.m. based on monomer weight; and 2,6-ditertiary-butyl, 4-methyl phenol, and the $\alpha$ and $\beta$-ionones, when present in amounts of greater than about 50 to less than about 200 p.p.m. based on monomer weight.

The advantages of this invention will be apparent from the following illustrative examples wherein all parts and percentages are by weight.

EXAMPLE 1

In each of a series of experiments, into a one gallon reactor equipped with an agitator and jacketed for heating and cooling was charged 1200 ml. of distilled water, 40 ml. of a 1.75 percent aqueous solution of a water-soluble hydroxy propyl methyl cellulose ether having a viscosity of about 500 cps.; along with varying amounts and types of a hereinafter specified polymerization inhibitor. Air was removed from the reactor by sweeping the interior of such reactor with vinyl chloride vapor. Thereafter 600 ml. of vinyl chloride monomer was added. The reactor temperature was then raised to about 56° C. and the agitator set at 400 r.p.m. There was then added varying amounts and types of a polymerization initiator (as hereinafter specified) as a 20 percent solution in iso-octane which solution was washed into the reactor with 60 ml. of vinyl chloride monomer. Reactor pressure at this point was about 118 pounds and polymerization began almost immediately upon initiator addition. The polymerization was permitted to continue at constant temperature until the reaction pressure had decreased to 80 pounds. Thereafter, unreacted monomer was vented, the reactor cooled, and the resulting polymer filtered and dried. During the polymerization reaction, the exothermic heat of polymerization was continually measured and the polymerization rate and percent conversion continually determined by means of a computer system with individual polymerization rates and percent conversion curves being plotted.

All polymerization reactions wherein no polymerization inhibitor was added were characterized by a rapid increase in polymerization rate or "hot-spot" near the end of the polymerization reaction. The presence of such "hot-spot," thus prevented the operation of the polymerization reactor at optimum cooling capacity throughout the reaction. The addition of the polymerization inhibitors, as specifically illustrated in the following Table I essentially eliminated such "hot-spot" and unexpectedly did not lower the average rate of polymerization of the polymerization reaction, i.e., the first half of the reaction was unchanged but the "hot-spot" was eliminated.

The following Table I sets forth the amount and types of polymerization initiators and inhibitors used as well as the polymerization rate (as percent conversion) at the peak or "hot-spot" of the polymerization reaction.

initiator which could be used to less than about .025 percent based on the weight of monomer in order to retain

TABLE I

| | Initiator | | Inhibitor | | Polymerization rates (percent conversion per hr.) | |
|---|---|---|---|---|---|---|
| Run Number | Kind | Amount (percent based on monomer) | Kind | Amount (p.p.m. based on monomer) | At peak | Avg. rate |
| For comparison: | | | | | | |
| 1. Isopropyl per carbonate (IPP) | | .025 | None | | 23 | 14 |
| 2. Lauroyl peroxide | | .4 | None | | 28 | 11.5 |
| This invention: | | | | | | |
| 3 | IPP | .025 | p-Methoxyphenol | 25 | 18 | |
| 4 | IPP | .025 | 2,6-ditert. butyl,4-methyl phenol | 50 | 21 | |
| 5 | IPP | .025 | do | 100 | 13.6 | |
| 6 | IPP | .025 | Hydroquinone | 25 | 18.4 | |
| 7 | IPP | .025 | α-ionone | 100 | 17 | |
| 8 | Lauroylperoxide | .4 | 2,6-ditert. butyl,4-metholphenol | 100 | 16.5 | |

The data in Table I illustrate that the use of the polymerization inhibitor effectively eliminated the polymerization "hot-spot." Effective concentrations of such inhibitors are those which reduce the polymerization rate at the peak to about the average, over-all rate obtained without a polymerization inhibitor.

It was further discovered that utilization of the specified polymerization inhibitors permit the use of significantly greater amounts of polymerization initiator (without exceeding the cooling capacity of the reactor) with a resulting enhancement of over-all polymerization rate. Data illustrating such result is contained in Table II.

EXAMPLE 2

A series of aqueous suspension polymerizations were conducted by the addition to a 3500 gallon reactor equipped with an agitator and jacketed for heating and cooling of 17,800 pounds of water, 250 pounds of a 1.75 percent aqueous solution of a water-soluble hydroxy propyl methyl cellulose ether having a viscosity of about 500 cps.; along with varying amounts of the polymerization inhibitor 2,6-ditertiary butyl, 4-methyl-phenol. Air was removed from the reactor by sweeping the reactor interior with vinyl chloride vapor and thereafter about 9,000 pounds of vinyl chloride monomer was added. The reactor temperature was then raised to 50 to about 55° C. There was then added varying amounts of the polymerization initiator isopropyl percarbonate (IPP) as a 20 percent solution in iso-octane. Polymerization began almost immediately upon initiator addition. During the polymerization reaction, the exothermic heat of polymerization was continually measured and the individual polymerization rates and percent conversion data recorded.

All polymerization reactions wherein no polymerization inhibitor was added were characterized by a rapid increase in polymerization rate or "hot-spot" near the end of the polymerization reaction and limited the amount of sufficient cooling capacity within the polymerization reactor. By way of comparison, the addition of about 110 p.p.m. of the polymerization inhibitor, 2,6-ditertiary butyl, 4-methyl phenol to such polymerization reaction essentially completely removed such "hot-spots" and permitted the use of up to about 0.3 percent of the polymerization inhibitor with a resulting significant increase in over-all polymerization rate.

The amounts of polymerization initiator and inhibitor as well as polymerization conditions and characteristics for each of these experiments are set forth on the following Table III.

Although the present invention has been specifically illustrated with regard to the use of certain polymerization inhibitors, it is to be understood that such invention applies to the use of any such inhibitor or combinations thereof capable of inhibiting the formation of a polymerization "hot-spot" during the aqueous suspension polymerization of vinyl chloride monomer, wherein such inhibitor is used in amounts which reduce the polymerization rate at such "hot-spot" to about the average over-all polymerization rate obtained without the presence of such inhibitor.

TABLE II

| Run number | Initiator (percent based on monomer) | Inhibitor (p.p.m. based on monomer) | Reaction | | Percent | |
|---|---|---|---|---|---|---|
| | | | Temp. (° C.) | Time (hrs.) | Conversion | Conversion per hr. |
| For comparison: 9 | 0.25 IPP | None | 56 | 5.77 | 80.0 | 13.8 |
| The invention: 10 | 0.4 IPP | 100 | 56 | 4 | 80 | 20 |

TABLE III

| Run Number | Initiator (percent based on monomer) | Inhibitor (p.p.m. 2,6-ditert. butyl, 4-methyl phenol based on monomer) | Reaction | | Percent | |
|---|---|---|---|---|---|---|
| | | | Temp. (° C.) | Time (hrs.) | Conversion | Conversion per hr. |
| For comparison: | | | | | | |
| 11 | .019 IPP | None | 55 | 8 | 92.5 | 11.5 |
| 12 | .021 IPP | None | 50 | 9.25 | 94 | 10.2 |
| This invention: | | | | | | |
| 13 | .025 IPP | 110 | 55 | 5.5 | 92.5 | 16.8 |
| 14 | .030 IPP | 110 | 50 | 8.0 | 90 | 11.2 |

What is claimed is:

1. In the aqueous suspension polymerization of vinyl chloride monomer in the presence of an oil soluble polymerization initiator and a protective colloid while utilizing autogenous pressure and polymerization temperatures between about 45° C. and 65° C. the improvement consisting of; the addition to the aqueous suspension of vinyl chloride monomer prior to initiation of polymerization thereof of from about 25 to 200 p.p.m. based on monomer weight of a polymerization inhibiting material selected from the group consisting of one or more of hydroquinone, p-methoxy phenol, phenol, alkoxy phenols, 2,6-ditertiary butyl, 4-methyl phenol and the α and β-ionones.

2. The process of claim 1 wherein said polymerization inhibiting material is present in amounts of from about 25 to 35 p.p.m. based on monomer weight when composed of one or more of hydroquinone, p-methoxy phenol, phenol and alkoxy phenols.

3. The process of claim 1 wherein said polymerization inhibiting material is present in amounts of greater than about 50 p.p.m. to less than about 200 p.p.m. based on monomer weight when composed of one or more of 2,6-ditertiary butyl, 4-methyl phenol, and α and β-ionones.

References Cited

UNITED STATES PATENTS

| | | | |
|---|---|---|---|
| 2,616,887 | 11/1952 | Danzig et al. | 260—92.8 |
| 2,662,867 | 12/1953 | Hoertz, et al. | 260—92.8 |

JOSEPH L. SCHOFER, Primary Examiner

J. A. DONAHUE, Jr., Assistant Examiner